H. BLACKBURN.
Wheel or Tool for Cutting, Sawing, or Grinding Stone, Wood, &c.
No. 237,472.      Patented Feb. 8, 1881.
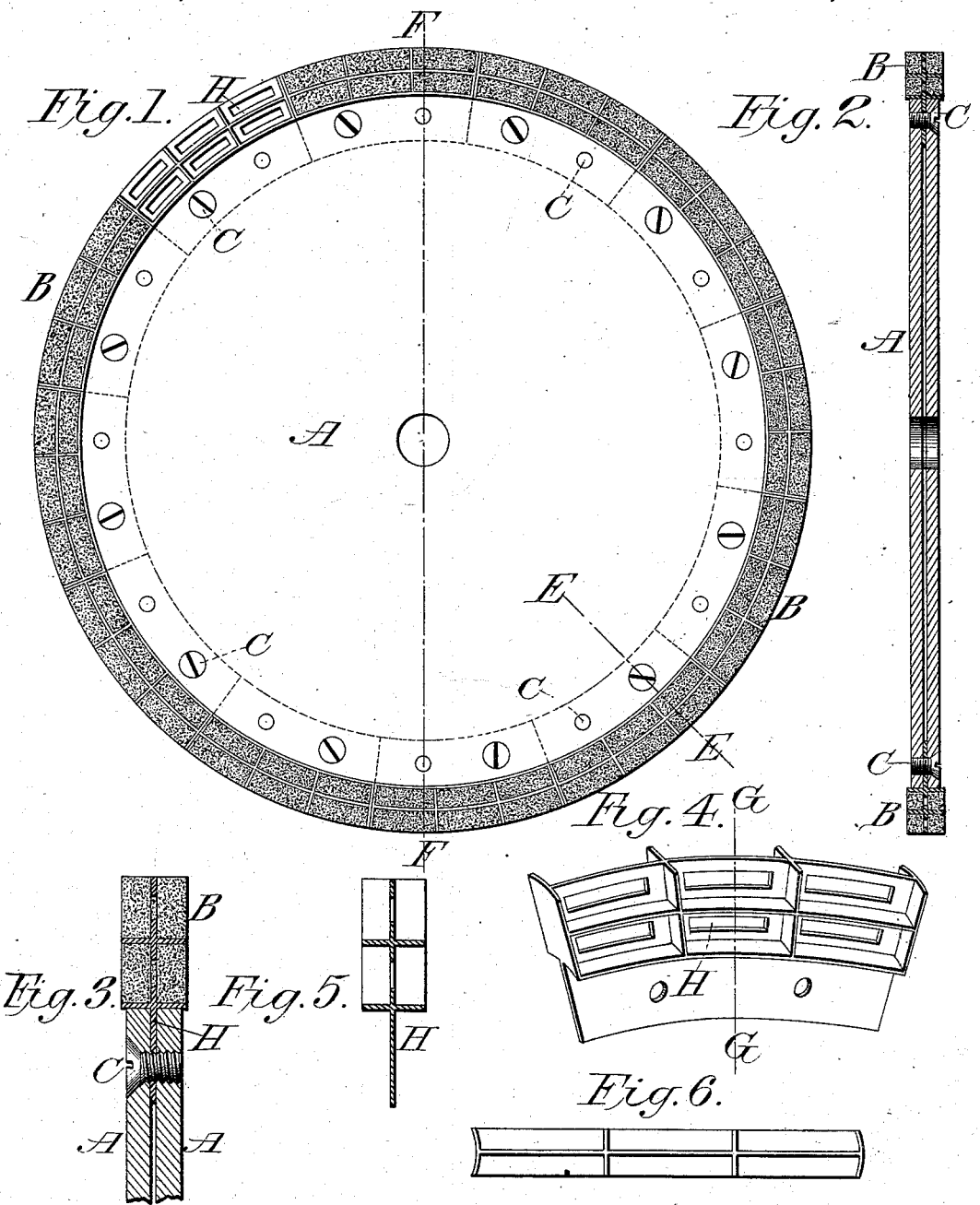

UNITED STATES PATENT OFFICE.

HENRY BLACKBURN, OF NASHVILLE, TENNESSEE.

WHEEL OR TOOL FOR CUTTING, SAWING, OR GRINDING STONE, WOOD, &c.

SPECIFICATION forming part of Letters Patent No. 237,472, dated February 8, 1881.

Application filed July 30, 1880. (Model.)

*To all whom it may concern:*

Be it known that I, HENRY BLACKBURN, of the city of Nashville, in the county of Davidson, and State of Tennessee, have invented certain new and useful Improvements in Wheels or Tools for Cutting or Sawing or Grinding Stone, Wood, or any Hard or Solid Material, of which the following is a specification.

The invention relates to a manner of applying emery, corundum, or other material suitable for cutting, sawing, or grinding, in combination with metal, so that thin disks of the cutting material may be used in wheels of great diameter.

It has been known heretofore that in making wheels of emery or corundum, and of the circular pattern, that as the diameter is increased the thickness of the disk has to be increased also, to add strength to the wheel, or it would burst when revolved to the required speed. This is objectionable, for the reason that so much material has to be cut away in making the kerf.

The object of my invention is to provide an economical and substantial apparatus by building up the body of the wheel with metal, and using the cutting substance at the periphery in such a manner that the cutters may be replaced by others when worn out without injury to the body of the wheel, and the diameter may be increased without adding to the thickness.

The principle of my invention may be applied to reciprocating grinders also; but I use circular grinders by preference.

In the accompanying drawings, in which similar letters of reference indicate like parts, Figure 1 is a side view of a wheel embodying my invention. Fig. 2 is a section of same through the line F F, showing the plates A, the cutters B, and screws C. Fig. 3 is a section, enlarged, through the line E E, Fig. 1. Fig. 4 is a perspective view of skeleton H. Fig. 5 is a section of same through the line G G. Fig. 6 is a top view of the same.

The cutters B are made somewhat thicker than the plates A, so that the plates may run clear when in operation. Said cutters are composed of a skeleton of thin metal, upon which the cutting or grinding material is cemented and pressed in suitable molds.

The operation is as follows: The plates A are laid evenly together. The cutters B are then inserted between the plates, with the shoulders of the cutters resting on the edges of the plates, and are there secured with the screws C. The wheel is then put on the mandrel and revolved as the ordinary saw. The skeleton H, to which the cutting substance is cemented, will wear away evenly with the cutting material used.

The wheel may be used with or without water.

What I claim is—

1. The combination of the plates A A, skeleton frame H, and screws C, substantially as and for the purpose specified.

2. The plates A A and frame H, in combination with a body of emery or other cutting or grinding material, substantially as shown and described.

HENRY BLACKBURN.

Witnesses:
JAMES I. MILLER,
WILLIAM O. SCHUBERT.